United States Patent
Lee et al.

(10) Patent No.: US 11,031,632 B2
(45) Date of Patent: Jun. 8, 2021

(54) METHOD FOR RECOVERING POSITIVE ELECTRODE ACTIVE MATERIAL FROM LITHIUM SECONDARY BATTERY

(71) Applicant: LG Chem, Ltd., Seoul (KR)

(72) Inventors: Dong Hun Lee, Daejeon (KR); Dae Jin Lee, Daejeon (KR); Ji Hoon Ryu, Daejeon (KR); Gi Beom Han, Daejeon (KR); Dong Hwi Kim, Daejeon (KR); Wang Mo Jung, Daejeon (KR); Sang Wook Lee, Daejeon (KR); Eun Sol Lho, Daejeon (KR)

(73) Assignee: LG Chem, Ltd.

( * ) Notice: Subject to any disclaimer, the term of this patent is extended or adjusted under 35 U.S.C. 154(b) by 403 days.

(21) Appl. No.: 15/866,654

(22) Filed: Jan. 10, 2018

(65) Prior Publication Data
US 2018/0212282 A1    Jul. 26, 2018

(30) Foreign Application Priority Data

Jan. 25, 2017 (KR) ......... 10-2017-0011831

(51) Int. Cl.
| | |
|---|---|
| *H01M 4/131* | (2010.01) |
| *H01M 10/54* | (2006.01) |
| *H01M 10/052* | (2010.01) |
| *H01M 4/505* | (2010.01) |
| *H01M 10/42* | (2006.01) |
| *H01M 10/52* | (2006.01) |
| *C22B 7/00* | (2006.01) |
| *C22B 1/00* | (2006.01) |
| *H01M 50/691* | (2021.01) |

(52) U.S. Cl.
CPC ......... *H01M 10/4242* (2013.01); *C22B 1/005* (2013.01); *C22B 7/001* (2013.01); *H01M 4/131* (2013.01); *H01M 4/505* (2013.01); *H01M 10/52* (2013.01); *H01M 10/54* (2013.01); *H01M 50/691* (2021.01); *H01M 10/052* (2013.01); *Y02W 30/84* (2015.05)

(58) Field of Classification Search
CPC .. H01M 10/42; H01M 10/4242; H01M 10/54; H01M 2/364; H01M 4/13–1315
See application file for complete search history.

(56) References Cited

U.S. PATENT DOCUMENTS

| | | | |
|---|---|---|---|
| 6,811,923 B1 * | 11/2004 | Sakai ................. | H01M 4/505 429/209 |
| 8,616,475 B1 | 12/2013 | Smith et al. | |
| 2007/0218360 A1 * | 9/2007 | Tabuchi ............... | H01M 4/525 429/224 |
| 2008/0050295 A1 * | 2/2008 | Uchida ................ | H01M 10/052 423/179.5 |
| 2015/0340689 A1 * | 11/2015 | Song ................... | H01M 4/5825 429/221 |

FOREIGN PATENT DOCUMENTS

| | | |
|---|---|---|
| CN | 102664294 A | 9/2012 |
| CN | 103618119 A | 3/2014 |
| JP | H1197076 A | 4/1999 |
| KR | 20000019850 A | 4/2000 |

OTHER PUBLICATIONS

Chinese Search Report for Application No. 201810070068.5 dated Jul. 31, 2020, 1 page.

* cited by examiner

*Primary Examiner* — Jonathan Crepeau
*Assistant Examiner* — Jacob Buchanan
(74) *Attorney, Agent, or Firm* — Lerner, David, Littenberg, Krumholz & Mentlik, LLP

(57) ABSTRACT

The present invention relates to a method for recovering a positive electrode active material from a lithium secondary battery including: 1) separating a positive electrode into a collector and a positive electrode part; 2) removing an organic substance by firing the separated positive electrode part; 3) washing the fired resultant and removing remaining fluorine (F); 4) adding a lithium-containing material into the washed resultant and firing to recover a lithium transition metal oxide.

12 Claims, No Drawings

METHOD FOR RECOVERING POSITIVE ELECTRODE ACTIVE MATERIAL FROM LITHIUM SECONDARY BATTERY

CROSS-REFERENCE TO RELATED APPLICATIONS

This application claims the priority of Korean Patent Application No. 10-2017-0011831 filed on Jan. 25, 2017, in the Korean Intellectual Property Office, the disclosure of which is incorporated herein by reference.

BACKGROUND OF THE INVENTION

Field of the Invention

The present invention relates to a method for recovering a positive electrode active material from a lithium secondary battery.

Description of the Related Art

As the technological development and demand for mobile devices have increased, the demand for secondary batteries as an environmentally-friendly alternative energy source is rapidly increasing. Among such secondary batteries, a lithium secondary battery having high energy density and voltage, along cycle life, and a low self discharge rate has been commercialized and widely used.

As a positive electrode active material of a lithium secondary battery, lithium transition metal oxides are being used, and among these, a lithium cobalt oxide of $LiCoO_2$, a lithium manganese oxide ($LiMnO_2$, $LiMn_2O_4$, or the like), a lithium iron phosphate compound ($LiFePO_4$ or the like), a lithium nickel oxide ($LiNiO_2$ or the like), or the like is mainly being used. In addition, as a method for improving low thermal stability of $LiNiO_2$ while maintaining an excellent reversible capacity of $LiNiO_2$, a nickel-manganese based lithium composite metal oxide in which some of nickel (Ni) is substituted by manganese (Mn) having excellent thermal stability and a nickel-cobalt-manganese based lithium composite metal oxide in which some of nickel (Ni) is substituted by manganese (Mn) and cobalt (Co) (hereinafter simply referred to as "NCM based lithium oxide") are being used.

However, such positive electrode active materials for lithium secondary batteries, for example, transition metals forming lithium cobalt oxides or NCM-based lithium oxides are expensive. In particular, cobalt belongs to strategic metals, the supply and demand thereof draws special interests from all the countries of the world, and the number of the countries producing cobalt is limited, and thus, cobalt is known as a metal having unstable supply and demand. In addition, since such transition metals may cause environmental problems, it is also necessary to cope with environmental restrictions.

In particular, since the demand for lithium secondary batteries has increased recently, problems, such as an unbalance in supply and demand, rising prices, environmental problems, further arise. Thus, the demand for methods of reusing or recycling positive electrode active materials of lithium secondary batteries is being recognized as an important problem as much as the production of lithium secondary batteries.

RELATED ART DOCUMENT

Patent Document

U.S. Pat. No. 8,616,475

SUMMARY OF THE INVENTION

An aspect of the present invention provides a method for recovering a positive electrode active material from a lithium secondary battery, the method being capable of economically and easily recovering a positive electrode active material from a lithium secondary batteries, and achieving an excellent resistive characteristic, an electrical conductivity characteristic, and a capacity characteristic without deteriorating electrochemical performance of the recovered positive electrode active material.

DETAILED DESCRIPTION OF THE PREFERRED EMBODIMENT

Hereinafter, the present invention will be explained in more detail to assist the understanding of the present invention.

Terms or words used in the specification and claims should not be interpreted as limited to a commonly used meaning or a meaning defined dictionaries, and should be interpreted as having a meaning that is consistent with their meaning in the context of the technical idea of the invention, based on the principle that an inventor may properly define the meaning of the words or terms to best explain the invention.

A method for recovering a positive electrode active material from a lithium secondary battery according to the present invention includes: 1) separating a positive electrode into a collector and a positive electrode part; 2) removing an organic substance by firing the separated positive electrode part; 3) washing the fired resultant and removing residual fluorine (F); and 4) adding a lithium-containing material into the washed resultant and firing to recover a lithium transition metal oxide.

First, in step 1), a positive electrode of a lithium secondary battery is separated into a collector and a positive electrode part.

The positive electrode of the lithium secondary battery is used in a state in which the collector (for example, an aluminum foil, a nickel foil, and a stainless foil) is coated with the positive electrode part including a lithium transition metal as a positive electrode active material. Therefore, in order to recover a lithium transition metal oxide from a lithium secondary battery positive electrode waste material, the positive electrode part containing the lithium transition metal oxide is required to be delaminated.

In a method of delaminating the positive electrode part containing the lithium transition metal oxide, the positive electrode part may be delaminated by being immersed in a solvent which does not actually dissolve the lithium transition metal oxide.

The solvent used for the above-mentioned delamination is not particularly limited if only the solvent does not actually dissolve the lithium transition metal oxide to be recovered, for example, water, chloroform, toluene, xylene, amides such as N-methyl-2-pyrrolidone and dimethylacetamide, carbonates such as dimethyl carbonate and diethyl carbonate, alcohols such as methanol and ethanol, ethers such as tetrahydrofuran and diethylether, ketones such as acetone and methylisobutyl ketone, esters such as methylacetate, nitriles such as acetonitrile and butyronitrile, or the like may be used, and more preferably, N-methyl-2-pyrrolidone (NMP) may be used.

As a method of delaminating the positive electrode part from the collector, either a method of immersing a positive electrode having the positive electrode part attached onto the collector, or a method of stirring a solvent while the positive electrode is immersed therein may be performed, and more preferably, the method of stirring the solvent may be performed.

The delamination may generally be performed at 10° C. or higher, that is, at a temperature lower than the boiling point of the solvent.

A preferable temperature varies with the solvent, but, for example, may be 20° C. to 90° C. An amount of the solvent used for the lamination may preferable be an amount, by which the positive electrode can be immersed in the solvent, and in general, an amount of 1 fold weight or more with respect to the positive electrode. In addition, the time required for the delamination varies with temperatures and stirring conditions, but, for example, may be 10 minutes to 10 hours.

In order to obtain the positive electrode part from the solvent in which the positive electrode delaminated from the collector is suspended, a method, in which the collector is removed by using gravity separation, filtering separation, centrifugal separation, magnetic separation, or the like, and then, the positive electrode part is filtered, may be performed. Examples of method for recovering the positive electrode part may include a general filtering separation method such as a pressurized filter, a central filter, and a filter press.

The positive electrode part may be separated by using another method for recovering the positive electrode part, in which the collector is removed from the solvent, in which the positive electrode is suspended, by using filtering, centrifugal separation, magnetic separation, or the like and then, suspended substances are allowed to sink by leaving the resultant in a stationary state. In addition, after removing the collector, the resultant is dried or fired to remove solvent, and thus, the positive electrode part may be separated.

After the positive electrode part is removed, the solvent may be recovered and reused, as it is, or after being purified, to delaminate the positive electrode part from the collector.

Next, in step 2), the separated positive electrode part is fired to remove an organic substance.

Before firing the positive electrode part, the positive electrode part separated from the collector may be pulverized. The positive electrode part may be pulverized by a pulverization method by using a hammer mill, a jet mill, a disk mill, or the like.

The firing may be performed at a temperature of 300-1200° C. More preferably, the firing may be performed at a temperature of 400-900° C., and most preferably, at a temperature of 400-800° C.

The firing may be performed at a temperature within the above-mentioned range, so that the organic substance included in the positive electrode part may be burnt and removed. The organic substance may be removed by being oxidized at a temperature within the above-mentioned range and changed into a gas shape. When the firing temperature is lower than 300° C., the organic substance may not be sufficiently burnt and removed, and when the firing temperature is higher than 1,200° C., excessive energy is unnecessarily consumed relative to the burning temperature and the performance of the recovered positive electrode active material may be deteriorated. The organic substance may be burnt and removed by performing the firing for 20-600 minutes, but the firing time is not necessarily limited thereto.

Examples of the organic substance included in the positive electrode part may include binders, conductors, vehicles, other organic solvents, or the like. In this case, fluorine (F)-containing materials may be included in various organic substances. For example, polyvinylidenefluoride (PVDF), vinylidenefluoride-hexafluoropropylene copolymer (PVDF-co-HFP) or the like may be included.

As described above, most of organic substances are burnt and removed by the firing step, the fluorine (F) groups in the fluorine (F)-containing material are not burnt and removed and remain by being applied or doped onto surfaces of lithium transition metal oxides. The residual fluorine (F) group has a problem of deteriorating the electrochemical performance of the recovered positive electrode active material. That is, the fluorine (F) group is not removed after the firing and applied or doped onto the surface of the positive electrode active material, so that resistance increases, electrical conductivity decreases, capacity decreases, thereby causing difficulty in recycling as a positive electrode active material.

Accordingly, the present invention subsequently includes a step of washing the fired resultant and thereby removing residual fluorine (F).

The washing may be performed by using pure water or an acidic aqueous solution. Since the residual fluorine (F) group has a structure dissolved in the pure water or an acidic aqueous solution, the residual fluorine (F) group may be removed by washing with the pure water or acidic aqueous solution, and a positive electrode active material with excellent performance may be recovered.

The acidic aqueous solution may include one or more organic acid or inorganic acid selected from the group consisting of sulfuric acid, hydrochloric acid, nitric acid, bromic acid, iodic acid, acetic acid, hydrofluoric acid, oxalic acid, and phosphoric acid, and more preferably, sulfuric acid or hydrochloric acid may be used.

The washing may be performed at a temperature of 0-100° C., and more preferably, 10-50° C., and performed for 1-600 minutes, and more preferably, 30-120 minutes, but the washing time is not necessarily limited thereto. When the washing temperature is lower than 0° C., the fluorine (F) group is not sufficiently dissolved and may thereby remained on the surface of the positive electrode active material, and there may be a limitation of increase in the resistance of the recovered positive electrode active material. When the washing temperature is higher than 100° C., water is vaporized and the efficiency of removing the fluorine (F) group may be deteriorated.

The washing may be performed by using 50-100,000 parts by weight, and more preferably, by using 100-1000 parts by weight of washing solution with respect to 100 parts by weight of the resultant. When the washing solution is less than 50 parts by weight, fluorine (F) groups are not sufficiently dissolved and may thereby remain on the surface of the positive electrode active material, and there may be a limitation of increase in the resistance of the recovered positive electrode active material. When the washing solution is more than 100,000 parts by weight, the productivity of washing step may be decreased, and the recovered rate of the positive electrode active material may be decreased.

Next, in step 4), a lithium-containing raw material is added to the washed resultant, is then fired to reform a lithium transition metal oxide.

As described above, the resultant, from which organic substances are removed by firing and which is obtained after washing, may include a positive electrode active material of the lithium transition metal oxide. However, in order to supplement lithium which becomes insufficient due to drop-off during the above-mentioned process, a step in which a lithium-containing raw material is added and fired is carried out.

As the lithium-containing raw material, lithium carbonate ($Li_2CO_3$), lithium hydroxide (LiOH), or the like may be used, and the lithium-containing raw material may be added in an amount of 1-40 parts by weight with respect to 100 parts by weight of the resultant, and more preferably, added in an amount of 1-30 parts by weight, and further more preferably, added in an amount of 1-10 parts by weight. Since this is for supplementing insufficient lithium, lithium-containing raw materials of more than 40 parts by weight may not be required to be added.

After the lithium-containing raw material is added, the resultant may be fired at a temperature of 500-1,200° C. to reform a positive electrode active material of the lithium transition metal oxide. When the firing temperature is lower than 500° C., the raw material may remain in particles due to an insufficient reaction, so that high-temperature stability may be decreased, and bulk density and crystallizability may be decreased, so that structural stability may be decreased. When the firing temperature is higher than 1,200° C., electrochemical performance may be decreased due to particle growth.

The recovered lithium transition metal oxide may be, but not limited to: a layered compound of a lithium cobalt oxide ($LiCoO_2$), a lithium nickel oxide ($LiNiO_2$) or the like or a compound substituted by one or more transition metals; a lithium manganese oxide such as chemical formula $Li_{1+x1}Mn_{2-x1}O_4$ (where, x1 is 0 to 0.33), $LiMnO_3$, $LiMn_2O_3$ and $LiMnO_2$; a lithium copper oxide ($Li_2CuO_2$); a lithium vanadium oxide such as $LiV_3O_8$ and $LiV_3O_4$; an Ni site-type lithium nickel oxide represented by a formula $LiNi_{1-x2}M1_{x2}O_2$ (where, M1=Co, Mn, Al, Cu, Fe, Mg, B or Ga, and x2 is 0.01 to 0.3); a lithium manganese composite oxide represented by a formula $LiMn_{2-x3}M2_{x3}O_2$ (where, M2=Co, Ni, Fe, Cr, Zn or Ta, and x3 is 0.01 to 0.1) or $Li_2Mn_3M3O_8$ (where, M3=Fe, Co, Ni, Cu or Zn); a lithium manganese composite oxide represented by a formula $LiNi_{x4}Mn_{2-x4}O_4$ (where, x4 is 0.01 to 1.0) and having a spinel structure; $LiMn_2O_4$ in which some Li in the formula is substituted by an alkali earth metal ion; a disulfide compound; $Fe_2(MoO_4)_3$; or the like.

In addition, the recovered lithium transition metal oxide may be a lithium transition metal oxide represented by formula 1 below.

$$Li_aNi_xMn_yCo_zM_wO_2+\delta$$ [Formula 1]

In formula 1, M includes one or more selected from the group consisting or Fe, Na, Mg, Ca, Ti, V, Cr, Cu, Zn, Ge, Sr, Ag, Ba, Zr, Nb, Mo, Al, Ga and B, and $0.9<a\leq2.0$, $0\leq x\leq0.95$, $0\leq y\leq0.8$, $0\leq z\leq1.0$, $0<w\leq0.1$, $-0.02\leq\delta\leq0.02$, $x+y+z\leq1$.

In addition, the recovered positive electrode active material may have a content of fluorine (F) of less than 1 wt %. More preferably, the content of fluorine (F) may be less than 0.1 wt %, or furthermore preferably, less than 0.05 wt %. As described above, the positive electrode part is fired to remove organic substances and is then fired, so that the residual fluorine (F) groups may be removed, and the content of fluorine (F) in the recovered positive electrode active material may be less than 1 wt %.

As such, according to the present invention, a positive electrode active material with less content of fluorine (F) may be recovered, and thus, when the recovered positive electrode active material is reused as a positive electrode active material, an excellent resistance characteristic, an electrical conductivity characteristic, and a capacity characteristic may be achieved.

Hereinafter exemplary embodiments of the present invention will be described in detail so as to be easily implemented by those skilled in the art to which the present invention pertains. The present disclosure may, however, be embodied in different forms and should not be construed as limited to the embodiments described herein.

Example 1

In a resin-made beaker, 50 g of a lithium secondary battery positive electrode to which a degraded positive electrode part was attached was added together with a stirring needle, the degraded positive electrode part including, on both surfaces of an aluminum collector, PVDF as a binder, carbon black as a conductor, 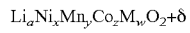$Co_{0.2}O_2$ as a positive electrode active material. As a solvent, 100 ml of NMP was added and then stirred at 40° C. for 30 minutes. After 30 minutes, an aluminum collector was taken out from a suspension, and the positive electrode part was recovered.

The recovered positive electrode part was pulverized by using a ball mill and fired at 500° C. for 300 minutes. After firing, 500 parts by weight of pure water (25° C.) was added with respect to 100 parts by weight of the resultant and then washed for 60 minutes.

With respect to 100 parts by weight of the washed resultant, 10 parts by weight of lithium carbonate ($Li_2CO_3$) was added and fired at 800° C. to obtain the positive electrode active material of lithium transition metal oxides.

Example 2

Except that 0.025 M sulfuric acid aqueous solution was used instead of pure water during washing, a positive electrode active material was recovered by the same process as the example 1.

Comparative Example

Except that washing was not performed, a positive electrode active material was recovered by the same process as the example 1.

Experimental Example 1: Content of Fluorine (F) Groups in Recovered Positive Electrode Active Material In order to verify the fluorine (F) content in the positive electrode active material recovered from examples 1 and 2, and the comparative example, an ion chromatography in which: a small amount of sample was sampled with respect to the positive electrode active material recovered from example 1 and 2, and the comparative example, F was eluted by using an excessive amount of ultra-pure water and a small amount of sulfuric acid and peroxide and the amount thereof was measured. The results are shown in Table 1 below.

TABLE 1

|   | Example 1 | Example 2 | Comparative example |
|---|---|---|---|
| F content (wt %) | 0.025 | 0.017 | 1.62 |

Referring to Table 1, it may be confirmed that in examples 1 and 2, the content of fluorine (F) in the recovered positive electrode active material is remarkably decreased compared to that in the comparative example.

Experimental Example 2: Electrochemical Performance Evaluation of Recovered Positive Electrode Active Material In order to evaluate the electrochemical performance of the recovered positive electrode active material from examples 1 and 2, and the comparative example, electrodes were formed by using 93 wt % of the positive electrode active material recovered from examples 1 and 2, and the comparative example, respectively, and electrochemical performance was evaluated by using 3-4.25 V. The results are shown in Table 2 below.

TABLE 2

|   | Charge capacity (mAh/g) 0.1C | Discharge capacity (mAh/g) 0.1C | Efficiency (%) | 2C rate (%) |
|---|---|---|---|---|
| Example 1 | 190.2 | 171.1 | 90.0 | 87.8 |
| Example 2 | 188.4 | 167.2 | 88.7 | 86.4 |
| Comparative example | 155.4 | 113.2 | 72.8 | 53.6 |
| Undegradaded positive electrode active material (LiNi$_{0.6}$Mn$_{0.2}$Co$_{0.2}$O$_2$) | 190.5 | 169.4 | 88.9 | 87.2 |

Referring to Table 2, in Examples 1 and 2, electrochemical performance, which is the same as or similar to that of a positive electrode active material before degradation, was shown. In Example 2, electrochemical performance slightly less excellent than that in example 1 due to the influence of acid was shown, but it may be confirmed that the electrochemical performance is remarkably better than that in the comparative example in which washing was not performed.

What is claimed is:

1. A method for recovering a positive electrode active material from a lithium secondary battery, the method comprising:
   1) separating a positive electrode into a collector and a positive electrode part;
   2) removing an organic substance by firing the separated positive electrode part;
   3) washing the fired resultant and removing residual fluorine (F); and
   4) adding a lithium-containing material into the washed resultant and firing to reform a lithium transition metal oxide,
   wherein the washing of step 3) is performed by using pure water.

2. The method for recovering a positive electrode active material from a lithium secondary battery of claim 1, wherein the firing of step 2) is performed at a temperature of 300-1,200° C.

3. The method for recovering a positive electrode active material from a lithium secondary battery of claim 1, wherein the firing of step 2) is performed for 20-600 minutes.

4. The method for recovering a positive electrode active material from a lithium secondary battery of claim 1, further comprising pulverizing the separated positive electrode part prior to the firing of step 2).

5. The method for recovering a positive electrode active material from a lithium secondary battery of claim 1, wherein the organic substance comprises a fluorine(F)-containing material.

6. The method for recovering a positive electrode active material from a lithium secondary battery of claim 1, wherein the washing of step 3) is performed at a temperature of 0-100° C.

7. The method for recovering a positive electrode active material from a lithium secondary battery of claim 1, wherein the washing of step 3) is performed for 1-600 minutes.

8. The method for recovering a positive electrode active material from a lithium secondary battery of claim 1, wherein the washing of step 3) is performed by using 50-100,000 parts by weight of washing solution with respect to 100 parts by weight of the resultant.

9. The method for recovering a positive electrode active material from a lithium secondary battery of claim 1, wherein in step 4), 1-40 parts by weight of a lithium-containing raw material is added with respect to 100 parts by weight of the resultant.

10. The method for recovering a positive electrode active material from a lithium secondary battery of claim 1, wherein the firing of step 4) is performed at a temperature of 500-1,200° C.

11. The method for recovering a positive electrode active material from a lithium secondary battery of claim 1, wherein the lithium transition metal oxide is represented by formula 1 below:

$$Li_aNi_xMn_yCo_zM_wO_{2+\delta}$$ [Formula 1]

(In formula 1, M includes one or more selected from the group consisting or Fe, Na, Mg, Ca, Ti, V, Cr, Cu, Zn, Ge, Sr, Ag, Ba, Zr, Nb, Mo, Al, Ga and B, and $0.9 < a \leq 2.0$, $0 \leq x \leq 0.95$, $0 \leq y \leq 0.8$, $0 \leq z \leq 1.0$, $0 < w \leq 0.1$, $-0.02 \leq \delta \leq 0.02$, $x+y+z \leq 1$).

12. The method for recovering a positive electrode active material from a lithium secondary battery of claim 1, wherein the recovered positive electrode active material has a content of fluorine (F) of less than 1 wt %.

* * * * *